INVENTOR
JAMES C. CUMMING

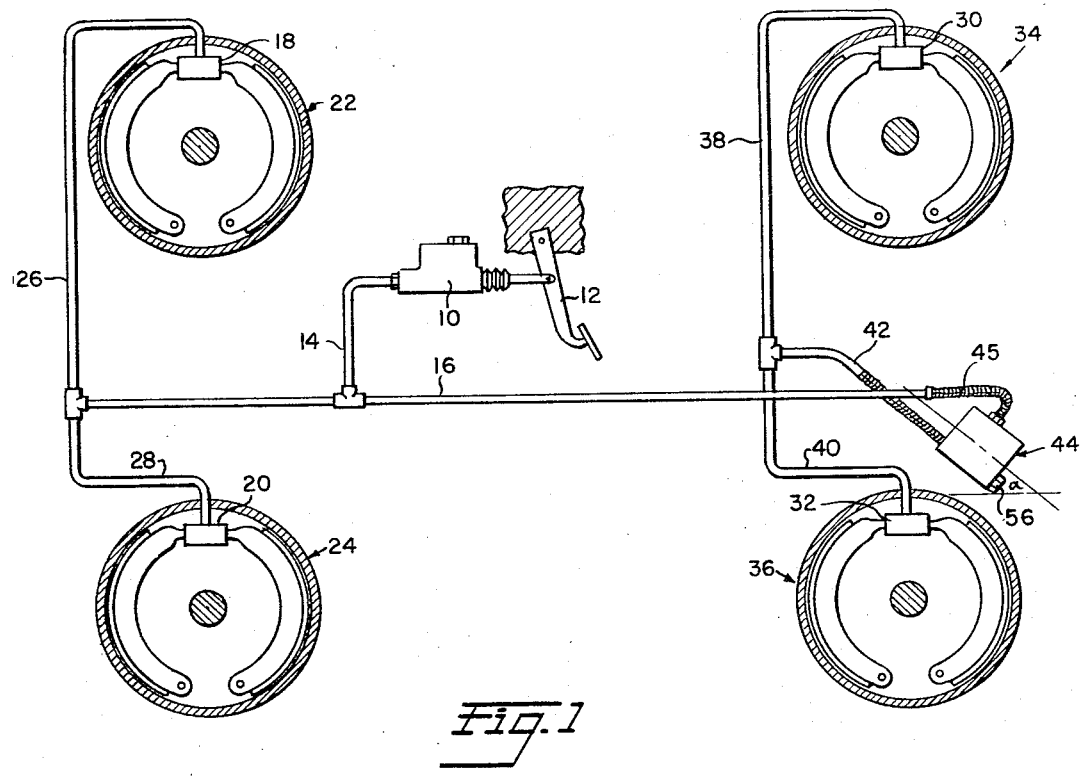
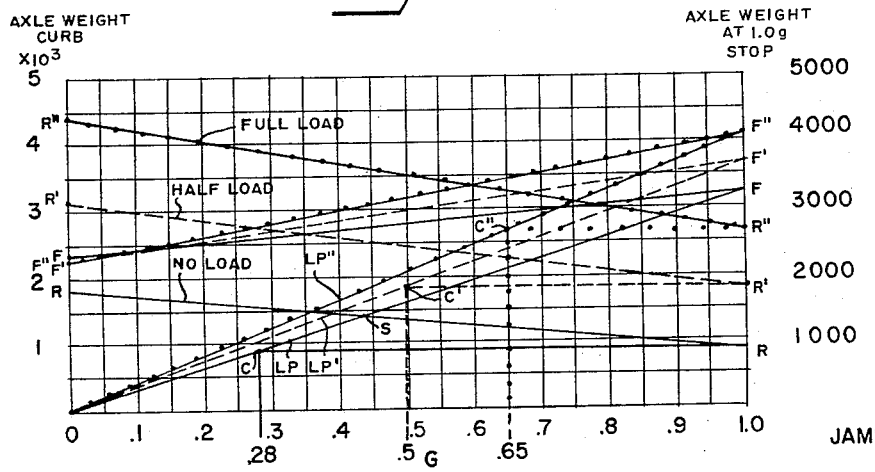

Strauch, Nolan & Neale
ATTORNEYS

Jan. 10, 1967  J. C. CUMMING  3,297,368
LOAD CONTROLLED BRAKE PROPORTIONING SYSTEM
Filed July 29, 1965  3 Sheets-Sheet 3
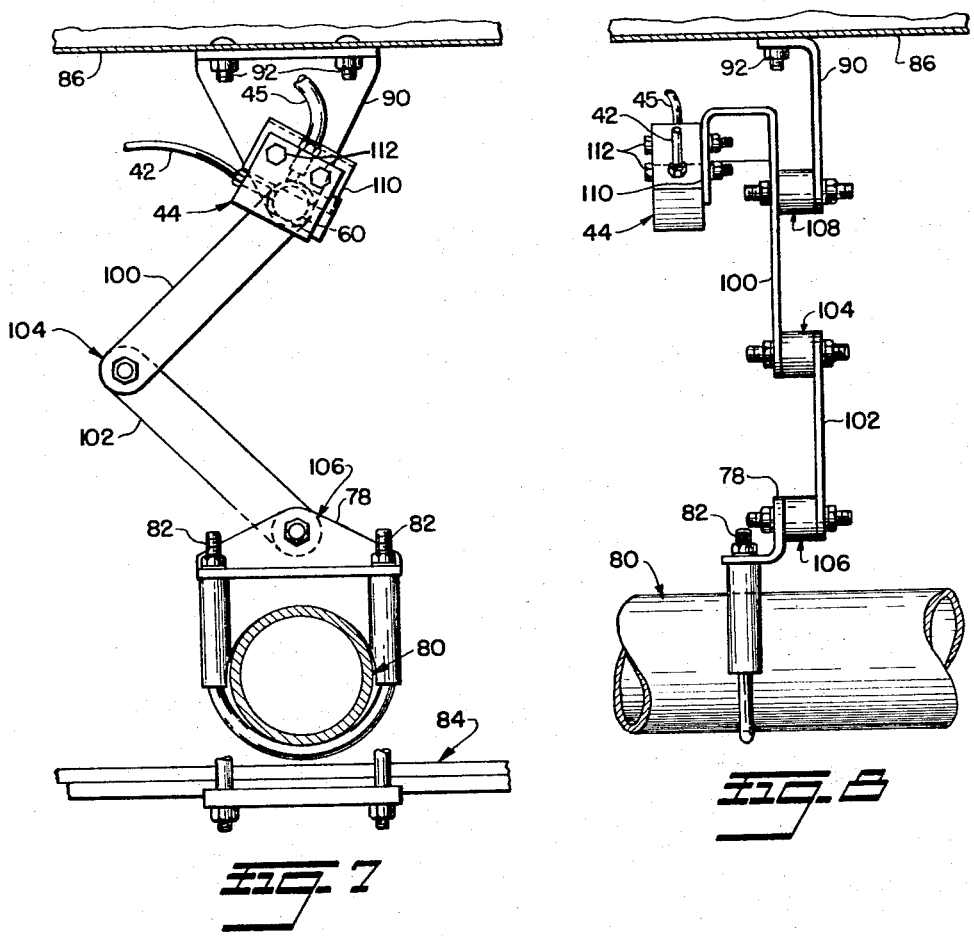
INVENTOR
JAMES C. CUMMING
BY Strauch, Nolan, Neale,
Nies and Bronaugh
ATTORNEYS

United States Patent Office 3,297,368
Patented Jan. 10, 1967

3,297,368
LOAD CONTROLLED BRAKE PROPORTIONING SYSTEM
James Charles Cumming, Pleasant Ridge, Mich., assignor to Rockwell-Standard Corporation, Pittsburgh, Pa., a corporation of Delaware
Filed July 29, 1965, Ser. No. 477,654
6 Claims. (Cl. 303—22)

This application is a continuation-in-part of application Serial No. 429,082, filed January 29, 1965, for Brake Systems, now abandoned.

The present invention refers to vehicle brake systems and more particularly to such systems including a load controlled brake proportioning device.

In the operation of vehicle braking systems the set of wheel brakes at the axle having the lightest static axle load tends to be locked-up before full braking is obtained at the other set of wheel brakes, thus causing the wheels to skid with resulting adverse effects on the controllability of the vehicles.

This effect caused by the uneven load distribution on the axles of the vehicle, is augmented by the load transfer which takes place during braking of the vehicle which shifts part of the weight of the vehicle at the rear axle to the front axle due to the moment of inertia. The amount of load transfer is in direct proportion to the rate of deceleration.

Customarily, the variations in static load on the wheels of a vehicle are taken into account by providing different size wheel brake cylinders at the front and rear wheels. In a front engine passenger car, for instance, the front wheel cylinders are usually larger than the rear wheel cylinders to compensate for the larger weight bearing on the front axle whereas in trucks or other commercial vehicles the rear wheel cylinders usually are larger than the front wheel cylinders because of the larger rear axle loads in these vehicles.

However, these variations in wheel cylinder sizes do not compensate fully for the load shift during brake application and for this reason various devices have been designed in the past to automatically proportion the brake pressure between the front and rear wheel brakes. Exemplary of such known prior devices are valve assemblies between the master cylinder and the wheel brakes associated with the wheels carrying the lightest load. Such prior valve assemblies usually have a movable ball adapted to close the valve in one position and to open the valve in another position. The valve assembly is usually mounted at an angle so the position of the ball is a function of gravity and inertia. Normally the ball is at the bottom of the valve assembly, opening the valve to provide free communicaiton of fluid. However, during brake application and subsequent deceleration of the vehicle, the ball shifts at a certain pre-selected rate of deceleration to close the valve and thus interrupt fluid communication from the master cylinder to the brakes at the wheel having the lightest load. The rate of deceleration at which the ball moves to close the valve depends on the inclination at which the valve assembly is mounted.

An example of such a prior arrangement is disclosed, for instance, in U.S. Patent No. 2,241,191 issued May 6, 1941 to W. R. Freeman.

However, all of the known prior art devices are operable only at a pre-selected rate of deceleration which is fixed once the device is mounted on the vehicle. Thus, the distance from the start of deceleration to the pre-selected point where the valve closes is fixed although it should vary widely depending on load conditions. Furthermore, these prior devices do not take varying load conditions into account which also affects the rate of deceleration. Since the prior proportioning devices are mounted at a fixed angle, which is calculated from a normal average vehicle load and average normal road conditions, actuation of these valves occurs always at a fixed point of deceleration, say 0.3 to 0.4g regardless of variations in load or in road surface conditions. However, if the load on the wheels whose brake pressure is to be controlled by this device is less than average, the valve should close at a lower rate of deceleration than the one pre-selected for the average weight. Otherwise, the controlled brakes lock prior to reaching the preselected rate of deceleration. Conversely, if the load is heavier than average, the closing of the proportioning valve should be delayed to occur at a higher rate of deceleration to have sufficient brake pressure available.

Accordingly, the primary object of the present invention resides in the provision of a pressure proportioning device for the brake system of a motor vehicle which is always effective to reduce or cut off pressure to the set of wheel brakes at the lightest loaded axle just prior to locking the brakes regardless of variation in the axle loading.

Another object is the provision of a pressure shut-off valve for a vehicle braking system installed between the master cylinder and one set of wheel brakes, the valve incorporating a ball movable on an inclined surface the angle of which varies as a function of the vehicle load, so that pressure to the one set of brakes will be shut-off when a predetermined rate of deceleration is attained under normal load conditions, and at other rates of deceleration as determined by the variation in load applied to the wheels associated with this set of brakes.

A further object is to provide a novel brake pressure proportioning device of the inclined surface inertia type mounted between an axle and the frame of the vehicle so that the inclination of the device will be changed upon suspension articulation due to varying loads on that axle.

Still another object of the present invention is to provide an improved inertia type pressure proportioning valve for a vehicle braking system in which the ball member contained in the valve comprises the sole means of closing or opening of the valve.

Other novel features will become more clearly apparent by the following detailed description having reference to the attached drawings in which:

FIGURE 1 is a schematic illustration of a vehicle braking system embodying the present invention;

FIGURE 6 is a graph plotted to show the load shifting during deceleration and the points of pressure cut-off at various loads;

FIGURE 7 is a side view of an alternate and presently preferred mounting of the inertia valve; and FIGURE 8 is a front view of the mounting of FIGURE 7.

Figure 4:
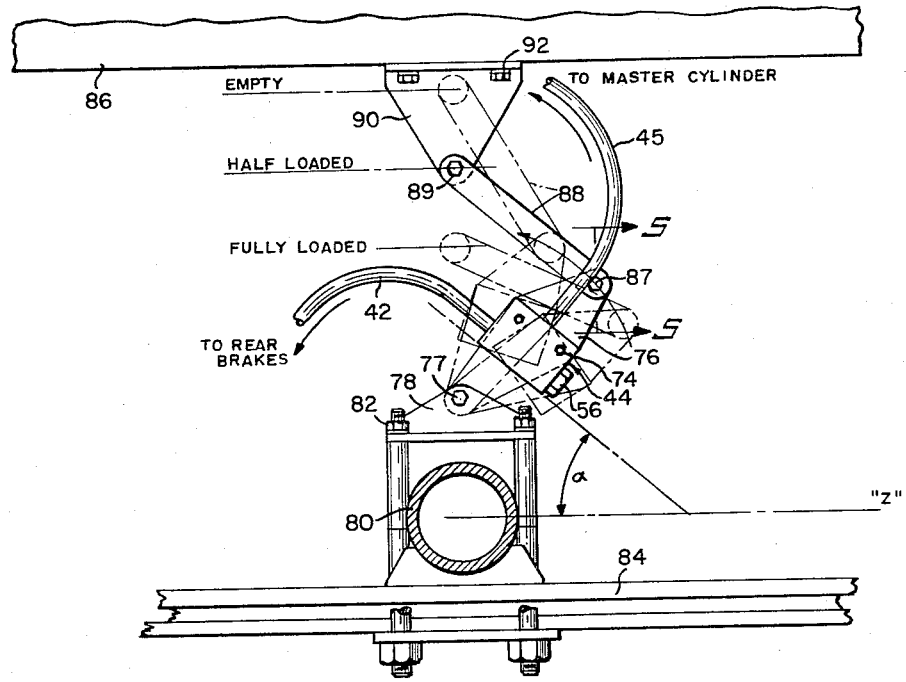
FIGURE 4 is a side view of the inertia valve installed on the axle of the vehicle showing the various valve positions from minimum to maximum load conditions.

With reference to FIGURE 1 there is shown a vehicle braking system illustrated schematically and which includes a master cylinder 10 adapted to be operated by the usual brake pedal 12. A conduit 14 leads from the pressure side of the master cylinder to a main conduit 16 which is connected directly to the wheel cylinders 18 and 20 of the front wheel brakes 22 and 24 through conduits 26 and 28. The wheel cylinders 30 and 32 of the rear wheel brakes 34 and 36 are connected by conduits 38 and 40, respectively, to a flexible branch conduit 42 which is in communication with the outlet side of the novel pressure control valve 44, the inlet side of which is connected by a flexible conduit 45 to conduit 16.

The wheel brakes 22, 24 and 34, 36 may be of any known construction and are here schematically illustrated as being of the anchored Lockheed type, it being understood that the present invention is not limited to a certain type of brake.

Figure 2:
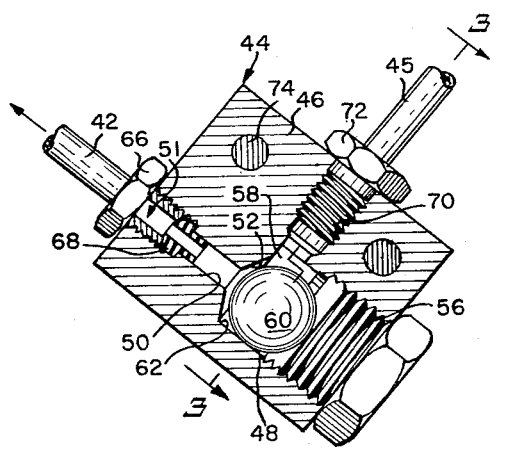
FIGURE 2 is an enlarged section through the inertia valve.
Figure 3:
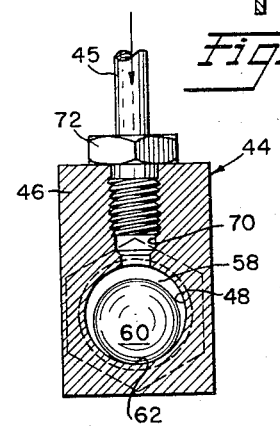
FIGURE 3 is a section taken along line 3—3 of FIGURE 2.

With further reference to FIGURES 2 and 3, the novel control valve 44 which is adapted to control the brake pressure at the wheels with which it is associated, in this instance the rear wheels, is basically an inertia valve which functions under certain conditions in the movement of the vehicle, such as deceleration during braking without having to overcome any internal resistance such as springs, etc.

The valve 44 comprises a valve body 46 bored longitudinally to provide eccentric stepped bores 48 and 50. The larger bore 48 extends approximately to the center of the valve body where it connects to the smaller bore 50 providing a chamfered valve seat 52. The outer end of bore 48 extending to the valve seat 52 constitutes a chamber 58 adapted to receive a metal ball 60 of smaller diameter than the chamber 58 which is freely movable between the seat 52 and the plug 56. Normally, the ball 60 rests on the lower surface 62 of the chamber 58 when the valve is properly installed as shown in FIGURE 2 and in this position the axis of the ball is on the centerline of the small bore 50. As illustrated in FIGURES 1 and 4 the valve 44 will be installed in the vehicle at an angle, with the plug 56 towards the rear of the vehicle pointing downwardly so that the ball 60 initially sits in the rear of the chamber 58 against the inner end of the plug. The lower chamber surface 62 upon which the ball rests is thus inclined and normally prevents the ball from moving against the valve seat 52. However, when the moving vehicle is braked, the ball 60 will, at a certain rate of deceleration, travel up the incline and close against the valve seat 52 due to its inertia. It will be noted that the distance the ball 60 travels from the end of the plug to the valve seat is very short to assure quick action of the valve and to reduce rolling friction to a minimum.

The small diameter bore 50 provides an outlet passage and is threaded at its outer end to receive a fitting 66 which connects to the flexible branch conduit 42 leading to the wheel cylinders 30 and 32 of the rear brakes 34 and 36.

Communication between the valve chamber 58 and the master cylinder 10 is provided by an inlet bore 70 leading into the valve chamber 58 opposite the surface 62 and which is threaded to receive a fitting 72 connected to flexible conduit 45 and thus to main conduit 16.

Thus, in the normal inclined position of the valve 44, that is, with the ball 60 resting against the inner end of the plug 56 as in FIGURE 2 the master cylinder 10 is in free fluid communication with the rear wheel brakes. However, under certain braking conditions this communication will be interrupted when the ball 60 becomes lodged against the valve seat 52, thus preventing any further flow of fluid from the master cylinder to the rear wheel cylinders as will be more fully explained hereafter.

The valve 44 may be installed in the vehicle braking system to change its inclination in response to variations in load at the rear axle either as illustrated in FIGURE 4 or as illustrated in FIGURES 7 and 8.

Referring first to the installation of FIGURE 4, the valve 44 is attached by screws 74 to an inclined lever 76 with the plug 56 towards the rear pointing downwardly. The lever 76 is at one end pivotally attached to a bracket 78, fastened to the rear axle 80 at any convenient location by studs 82. The axle 80 is connected in the usual way by a suspension comprising a multi-leaf spring 84 to the vehicle frame 86, these connections not being illustrated since they may be conventional.

The other end of the lever 76 is pivotally attached to the end of another lever 88 which is inclined upwardly towards the frame 86 and is pivotally attached at its other end to a bracket 90 fastened to the frame by screws 92.

The relative position of the connected levers 76 and 88 in relation to each other and to the axle 80 is such that the common pivot point 87 of the two levers is rearwardly of the axle 80 and the pivot point 77 of lever 76 at the axle and pivot point 89 of lever 88 at the frame are, under static load conditions, on a common vertical line "X" passing through the centerline of the axle. By this arrangement which provides a scissor-like lever action between the axle and the frame of the vehicle, the inclined position of the valve 44 will be varied under articulation of the suspension and under varying loads applied on axle 80 as indicated in phantom lines in FIGURE 3 showing the range from empty to fully loaded condition. Thus, the angle of inclination to the horizontal indicated by the line "Z" is varied causing the valve to be actuated at varying rates of deceleration depending on load conditions in contrast to the fixed position pressure control valves of prior art devices which are actuated at only one pre-selected rate of deceleration.

Figure 5:
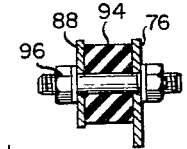
FIGURE 5 is a section through the lever arm connection taken along line 5—5 of FIGURE 4.

The pivot connection of the levers 76, 88 is preferably by means of a block of rubber 94 and bolt and nut assembly 96 as shown in FIGURE 5 to dampen vibration effects and reduce noise and wear in addition to the ability to resist twisting loads at the pivot connections during articulation.

In operation the operator applies the brakes in the usual manner by depressing foot pedal 12 thereby exerting pressure on the fluid in the master cylinder 10 which is transferred through the main conduit 16 to the front brakes 22 and 24 and via the valve 44 which is open to the rear brakes 34 and 36. When a certain rate of deceleration is reached, which is dependent on the load on the rear axle and the rate of load transfer, the ball 60 rides up the inclined surface 62 due to its inertia and closes the outlet 51 by seating against the valve seat 52 thus preventing the application of additional pressure to the rear wheel brakes. Thereafter, continued pressure through the inlet 70 holds the ball 60 firmly against the valve seat. The valve 44 will close preferably just short of the point at which the rear brakes lock.

Upon release of brake pedal 12 the reduction of pressure at the inlet port 70 together with the force of the usual return springs at the rear brakes causes fluid flow in reverse direction and immediately moves the ball 60 away from valve seat 52 to open communication between the ports 51 and 70 through chamber 58.

The initial inclination of the valve 44 which determines the point of valve closing can be exactly determined by calculating the load shift ratio at a given load on the front and rear axle in relation to the line pressure of the brake system from 0.0$g$ (start of deceleration) 1.0$g$ (maximum stop of the vehicle).

By plotting a graph in which the abscissa represents the rate of deceleration the left ordinate represents the curb load at the start of deceleration and the right ordinate represents the axle load at 1.0$g$ or stop. The respective values are then drawn as straight lines from left to right as illustrated in the composite graph of FIGURE 6 to arrive at the desired point of pressure cut-off as will be more clearly explained in the following examples from which the graph of FIGURE 6 was plotted.

The load shift ratio between front and rear axles is determined by dividing the center of gravity (in inches) by the wheel base (in inches) and multiplying the result in the total load on both axles. The resultant amount is the amount of load shifted from the rear axle to the front axle during the deceleration. In other words this amount is added to the front axle and deducted from the rear axle. This load variation during deceleration can be plotted as straight lines in the graph of FIGURE 6 in which the solid lines represent the axle loads of an empty vehicle during deceleration. Line R—R represents the rear axle load and line F—F the front axle load. The solid line LP represents the line pressure of the braking system when the brake work is equally divided between the front and rear brakes. This intersection "S" between the line LP and the line R—R represents the pressure at which the rear brakes would be locked under normal conditions and when no pressure control device is used. It is the purpose of the system of the present invention to cut-off the line pressure at the rear brakes in advance of reaching point "S" to prevent locking of the rear brakes and subsequent skidding of the vehicle. This is accomplished by preferably limiting the line pressure to the rear brakes to a value just below that which locks the brakes assuring the maximum load shift caused by deceleration at the maximum rate. This value is determined by drawing a horizontal line from point "R" at 1.0$g$ (stop) to the line LP. The point of desired cut-off is at "C" where the lines intersect, giving in this instance a rate of deceleration of .28$g$ at which the valve 44 closes. Thus, as the line pressure to the front axle increases the line pressure to the rear axle is cut-off at .28$g$ to thereafter remain constant.

A convenient way to determine the angle $\alpha$ of inclination of the valve 44 to assure cut-off at the desired rate of deceleration was found by assuming the calculated rate of deceleration for cut-off, in this instance .28$g$ to be the tangent of the angle $\alpha$ of inclination. This angle is 15.6°. By mounting the valve 44 at exactly this angle to the horizontal the value functioned to close at the calculated rate of deceleration. Once the initial position of the valve 44 was determined in this way the relation remained to be true throughout the entire range of loading condition.

The broken lines $R^1$—$R^1$, $F^1$—$F^1$ and $LP^1$ graphically illustrate the functioning of the valve when the vehicle is half loaded. Here the desired point of cut-off was found to be at .5$g$ which, assuming .5$g$ to be a tangent required a 26.6° inclination of the valve. The scissor type lever arrangement to which the valve is attached is constructed and proportioned to provide this angle at half load.

The dotted lines $R''$—$R''$, $F''$—$F''$ and $LP''$ represent the functioning of the valve under fully loaded conditions. Here the desired point of cut-off was found to be at .65$g$ requiring the valve 44 to be at an angle of 33° which was also produced by the lever mechanism.

It has been found in practice that while the mounting of the valve 44 as shown in FIGURE 4 is satisfactory for most purposes, nevertheless, the valve may be subject to excessive vibration in particularly heavy duty use especially when installed in off high vehicles which frequently traverse rough terrain. Under these severe operating conditions the vibration encountered in use may unlodge the ball from its seat and prematurely cut off fluid pressure to the rear brakes. The mounting of FIGURES 7 and 8, to which detailed reference will now be made, eliminates this difficulty and is capable of functioning in the desired manner even under the most adverse operating conditions.

As in the previously described embodiment the mounting assembly includes a jack-knifing lever assembly comprising upper and lower links 100 and 102 pivotally connected to each other by a resilient pivot construction indicated generally at 104 which is preferably the same construction as the connection shown in FIGURE 5 described above. At its lower end the link 102 is pivotally connected as at 106 to the plate 78 clamped to the axle 80 in the manner previously described.

At its upper end the upper link 100 is pivotally connected as at 108 to the mounting plate 90 carried by the vehicle frame 86 in the manner previously described. As best shown in FIGURE 8 the upper end of the upper link 100 projects upwardly beyond the upper pivot 108 and is reversely bent to provide a flat mounting area 110 to which the valve assembly 44 is secured by a plurality of bolts 112.

As in the previously described embodiment the valve assembly 44 is so mounted as to incline the axis of the passage 50 upwardly in a forward direction. Further, in the embodiment of FIGURES 7 and 8, the valve is so mounted as to dispose the center of the ball 60 in alignment with the axis of the upper pivot 108.

The apparatus is shown in FIGURES 7 and 8 in a typical position assumed when the vehicle carries a moderate load. When the load is increased, the distance between the pivots 108 and 106 will decrease thus rotating the valve assembly 44 to increase the angle of inclination of the passage 50. Conversely, when the load is decreased the angle of inclination of the valve assembly is correspondingly decreased. In each case the result is the same as that described in connection with the previous embodiment.

Because of the mounting in the valve assembly 44 adjacent the upper pivot, the effects of vibration on the valve assembly will be minimized since the vibrations occuring at the axis are largely absorbed by the suspension and the remainder dampened out by the resilient pivots. Further, since the ball 60 in the valve assembly 44 is located essentially in alignment with the center of rotation of the upper pivot it is not effected by rotational movements of the links during vehicle travel.

From the foregoing it will be seen that the present novel pressure control valve functions under any load condition from empty to fully loaded and adjusts itself to the proper inclination to assure cut-off at any desired rate of deceleration corresponding to the respective load conditions.

The advantages of this system over prior units in which the pressure control valve was rigidly mounted at a certain angle which remained constant regardless of load variations will be readily apparent. The cut-off was at a pre-selected constant rate of deceleration which is wholly inadequate. If, for instance, the pre-selected rate of deceleration for cut-off was set at .5$g$ it will be ineffective in a lighter loaded vehicle since the selected cut-off point is beyond the point "S" of locking the brake. The cut-off in prior devices would usually occur far too early in a heavier loaded vehicle thus depriving the rear brakes of sufficient braking power.

It will be further appreciated that in the present pressure control valve no internal resistances have to be overcome by the ball during its movement as in known devices which rely on additional poppet valves for fluid communication, the operation of which is controlled by the ball. In the present invention the ball constitutes the sole means to control the fluid communication through the valve. Furthermore, rolling friction is reduced to a minimum due to the exceedingly short travel of the ball assuring fast reaction and less wear.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A braking system for use with a vehicle having a body and spring suspended axles carrying front and rear ground engaging wheel sets each equipped with a fluid pressure operated brake comprising an operator controlled fluid pressure source, conduits connecting said source to said brakes, a normally open valve assembly in the conduit leading to certain of said brakes, said valve assembly comprising a valve chamber having a seat adjacent one end, a valve closure element received in said chamber for free movement toward and away from said seat, a scissors linkage comprising a pair of articulated links the free ends of which are connected, respectively, to said spring suspended axle and to said body, means mounting said valve on one of said links to incline said chamber and to dispose said seat at the upper end thereof whereby said valve elements is urged away from said seat by gravity and toward said seat by inertia when the vehicle is decelerated, said articulated linkage being operable to increase the angle of inclination of said chamber upon an increase in vehicle load.

2. The brake system according to claim 1 wherein said valve assembly is carried by the link connected to said vehicle axle.

3. The brake assembly according to claim 1 wherein said valve assembly is carried by tthe link connected to said body.

4. A braking system for use in the vehicle having a body and spring suspended axles carrying front and rear ground engaging wheel sets, each equipped with a fluid pressure operated brake comprising an operator controlled fluid pressure source, conduits connecting said source to said brakes, a normally open valve assembly in said conduit leading to one set of brakes, said valve assembly comprising a valve chamber having a seat adjacent one end, a valve closure element received in said chamber for free movement toward and away from said seat, a pair of articulated links connected, respectively, to said axle and to said body, and means mounting said valve assembly on the one of said links connected to said body to dispose said valve element in alignment with the pivot connecting said one link to said body.

5. The braking system according to claim 4 wherein the pivots connecting the links to each other, to said body and to said axle comprise resilient shock absorbing blocks to dampen the vibration transmitted from said axle assembly to said valve assembly.

6. A braking system for use with a vehicle having a body and spring suspended axles carrying front and rear ground engaging wheel sets, each equipped with a fluid pressure operated brake, comprising an operator controlled fluid pressure source, conduits connecting said source to said brakes, a normally open valve assembly in the conduit leading to one set of brakes, said valve assembly comprising a valve chamber having a seat adjacent one end, a valve closure element received in said chamber for free movement toward and away from said seat, a scissors linkage mounting said valve to incline said chamber and to dispose said seat at the upper end thereof whereby said valve element is urged away from said seat by gravity and toward said seat by inertia when the vehicle is decelerated, one end of said scissors linkage being connected to said spring suspended axles and the other end of said scissors linkage being so arranged as to increase the angle of inclination of said chamber in response to an increase in the vehicle load.

References Cited by the Examiner

UNITED STATES PATENTS

| 2,030,288 | 2/1936 | Freeman. | |
|---|---|---|---|
| 2,241,191 | 5/1941 | Freeman | 303—24 X |
| 2,876,044 | 3/1959 | Hill | 303—24 |
| 2,934,381 | 4/1960 | Hill | 303—22 X |
| 3,030,154 | 4/1962 | Hill | 303—24 X |
| 3,035,870 | 5/1962 | Beatty | 303—6 |
| 3,087,761 | 4/1963 | Stelzer | 303—24 |
| 3,140,124 | 7/1964 | Heiland | 303—6 |

EUGENE G. BOTZ, *Primary Examiner.*